United States Patent
Kimura et al.

(10) Patent No.: US 8,459,162 B2
(45) Date of Patent: Jun. 11, 2013

(54) EDGE REPLACEMENT TIP AND CUTTING TOOL USING THE SAME

(75) Inventors: Norihide Kimura, Hyogo (JP); Masanobu Ueda, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1363 days.

(21) Appl. No.: 10/545,158

(22) PCT Filed: Feb. 12, 2004

(86) PCT No.: PCT/JP2004/001510
§ 371 (c)(1),
(2), (4) Date: May 11, 2006

(87) PCT Pub. No.: WO2004/071695
PCT Pub. Date: Aug. 26, 2004

(65) Prior Publication Data
US 2006/0257216 A1 Nov. 16, 2006

(30) Foreign Application Priority Data
Feb. 14, 2003 (JP) .................................. 2003-036347

(51) Int. Cl.
*B23D 61/04* (2006.01)
*B23B 27/16* (2006.01)

(52) U.S. Cl.
USPC ............. 83/835; 407/104; 407/108; 407/109; 407/113

(58) Field of Classification Search
USPC ................... 83/835, 158, 904; 407/104, 108, 407/109, 113, 114, 24, 25, 110, 103; 408/13, 408/713, 178, 188; D15/139
See application file for complete search history.

(56) References Cited

U.S. PATENT DOCUMENTS 3,500,523 A * 3/1970 Cashman et al. ................. 407/6
4,068,976 A * 1/1978 Friedline ....................... 407/114
(Continued)

FOREIGN PATENT DOCUMENTS

| DE | 7600988 | 5/1976 |
| DE | 7600988 U | 5/1976 |

(Continued)

OTHER PUBLICATIONS

Japanese Office Action, with English translation, issued in Japanese Patent Application No. JP 2003-036347, mailed Mar. 11, 2008.

(Continued)

*Primary Examiner* — Ghassem Alie
(74) *Attorney, Agent, or Firm* — McDermott Will & Emery LLP

(57) ABSTRACT

In order to perform turning operations of the kind that has heretofore been performed by diamond-shaped inserts, an insert which is basically equilateral triangular in shape with multiple alternately usable cutting edges, of which all three corners are usable as cutting edges, without decreasing the positional accuracy of the cutting edge during cutting. At least one recess and a plurality of protrusions are formed on each side of the insert. The recess and protrusions formed on the insert are brought into engagement with a protrusion and recesses formed on a side wall of a seating groove formed in a holder. In this state, the insert is pressed against a bottom seating face and the side wall of the seating groove with a clamp as a means to stably restrain the insert. This prevents shifting of the cutting edge during cutting even if the direction of the cutting force changes.

3 Claims, 4 Drawing Sheets

U.S. PATENT DOCUMENTS

| | | | | |
|---|---|---|---|---|
| 4,140,431 A * | 2/1979 | Friedline et al. | ............... | 407/114 |
| 4,602,897 A | 7/1986 | Teets | | |
| 4,629,371 A * | 12/1986 | Maeda et al. | ................. | 407/114 |
| 4,632,608 A * | 12/1986 | Blomberg et al. | ............ | 407/114 |
| 4,648,760 A * | 3/1987 | Karlsson et al. | .............. | 408/223 |
| 4,681,486 A * | 7/1987 | Hale | ............................. | 407/114 |
| 4,692,070 A | 9/1987 | Shikata | | |
| D305,662 S * | 1/1990 | Niebauer | ..................... | D15/139 |
| 5,000,626 A * | 3/1991 | Bernadic et al. | .............. | 407/114 |
| 5,308,197 A * | 5/1994 | Little | ............................ | 407/101 |
| 5,441,370 A * | 8/1995 | Pantzar et al. | ................. | 407/113 |
| 5,503,509 A | 4/1996 | Von Haas et al. | | |
| D411,551 S * | 6/1999 | Bernadic et al. | ..................... | D15/139 |
| 5,921,721 A * | 7/1999 | Hintze et al. | .................. | 407/113 |
| 6,053,672 A * | 4/2000 | Satran et al. | .................... | 407/40 |
| 6,527,485 B1 * | 3/2003 | Little | .............................. | 407/24 |

FOREIGN PATENT DOCUMENTS

| | | | |
|---|---|---|---|
| EP | 0 865 851 A1 | | 9/1998 |
| GB | 2081142 A | * | 2/1982 |
| JP | 53-140687 | | 12/1978 |
| JP | 61-014089 | | 1/1986 |
| JP | 61-050604 | | 3/1986 |
| JP | 61-50604 | | 4/1986 |
| JP | 2-85504 | | 7/1990 |
| JP | 10-328909 | | 12/1998 |
| JP | 2001-509087 | | 7/2001 |

OTHER PUBLICATIONS

European Search Report issued in European Patent Application No. 04710549.9-2302, mailed Mar. 10, 2011.

* cited by examiner (a)

(b)

(a)

(b)

EDGE REPLACEMENT TIP AND CUTTING TOOL USING THE SAME

This application is a U.S. national phase application of PCT international application PCT/JP2004/001510, filed on Feb. 12, 2004, which in turn claims the benefit of Japanese Application No. 2003-036347, filed Feb. 14, 2003, the disclosures of which Applications are incorporated by reference herein.

TECHNICAL FIELD

This invention relates to an insert with multiple alternately usable cutting edges which is basically equilateral triangular in shape, and a turning tool comprising a holder and an insert of this type mounted on the holder.

BACKGROUND ART

Known turning tools include ones which carry a diamond-shaped insert with multiple alternately usable cutting edges. Using the two acute corners of such a diamond-shaped insert, a negative side cutting edge angle and a positive end cutting edge angle can be formed. Thus, one such tool can perform cutting of radially outer surfaces or end faces of workpieces, as well as contour cutting, so that these tools are now being widely used.

But since only two of the four corners of such diamond-shaped inserts can be used as cutting edges, diamond-shaped inserts are economically disadvantageous over triangular or square inserts.

On the other hand, triangular inserts are advantageous in that all of its three corners are usable as cutting edges. But if trials are made to perform cutting of radially outer surfaces and end faces of workpieces, as well as contour cutting with a single such triangular insert, the triangular insert can be supported on the side of the seating face of the holder along only one of its three sides. Thus, compared to diamond-shaped inserts, of which two sides defining an acute corner are restrained, such conventional triangular inserts can be supported less stably on the holder.

The following patent documents propose solutions to these problems.
Patent document 1: JP patent publication 2001-509087
Patent document 2: JP patent publication 10-328909

DISCLOSURE OF THE INVENTION

The tools disclosed in the above patent documents include a regular polygonal insert having four or more corners and having arcuately concave side faces so that all the corners have an apex angle less than 90 degrees and thus can be used as cutting edges.

However, for the tools of Patent documents 1 and 2, adjacent corners tend to interfere with each other, so that if these inserts are mounted on cutting tools of which the side cutting edge angle is −5 degrees, it is impossible to cut a flange to its root. Thus, compared to tools using diamond-shaped or triangular inserts, the areas of workpieces to which the cutting edges of such inserts are accessible are extremely limited.

An object of the present invention is to provide a triangular insert which can be stably restrained even though only its bottom surface and one side can be restrained so that it can economically perform cutting of the kind that has heretofore been possible only with diamond-shaped inserts while maintaining high positional accuracy of the cutting edge during cutting.

According to the present invention, there is provided a plate-shaped cutting insert with multiple alternately usable cutting edges having basically the shape of an equilateral triangle and including three acute corners and sides between the corners, each of the sides being formed with a V-shaped recess and at least two V-shaped protrusions as seen from the top of the insert, the recess and the protrusions being adapted to be brought into engagement with a protrusion and recesses formed on a side wall of a holder, the protrusions on each side being symmetrical with respect to a line connecting the center of the insert with the center of the each side.

Each of the protrusions is preferably defined by two flat surfaces forming an angle of 60 to 120 degrees as seen from the top of the insert. Preferably, each of the three corners has an apex angle of 35 to 80 degrees.

The protrusions have apexes that are located on or inside of lines connecting the corners.

Three or more protrusions are preferably provided with equal pitches.

The insert is preferably formed by sintering because sintering is inexpensive. In this case, no further treatment is preferably performed on the sintered surfaces of the protrusions and recesses.

According to the present invention, there is also provided a cutting tool comprising a holder having at its front end a seating groove including a side wall and a bottom seating face, and the insert of above-described type, which is seated in the seating groove, the insert being fixed to the holder by bringing the protrusions and recess formed on one of the sides into engagement with respective recesses and protrusion formed on the side wall of the holder and pressing the insert against the bottom seating face and the side wall with a clamp means. The remaining two sides of the insert are not in engagement with the holder.

Preferably, this tool further comprises a piece detachably mounted to the side wall of the holder and fixed to the holder by means of a fastener, the piece being formed with the recesses and protrusion adapted to be brought into engagement with the protrusions and recess formed on one of the sides of the insert.

According to the present invention, the recess and protrusions are formed on each side of the basically equilateral triangular insert. The recess and protrusions on one side of the insert are brought into engagement with the protrusion and recesses formed on the side wall of the holder, and the bottom and the side of the inert are pressed against the bottom seating face and side wall of the seating groove. Thus, when cutting radially outer surfaces and end faces or workpieces and performing contour cutting with a single such insert, the insert can be stably restrained while ensuring necessary side cutting edge angle and end cutting edge angle. By pressing one side of the insert against the side wall, the V-shaped recess and protrusions formed on the one side of the insert are brought into engagement with the V-shaped protrusion and recesses formed on the side wall. This reliably prevents shifting of the insert along the side wall. Thus, even if the direction of the cutting force changes during cutting, the cutting edge is held position with high positional accuracy.

As with conventional triangular inserts, all three corners of the insert according to the present invention are usable, which is one economical advantage over diamond-shaped inserts.

By determining the apex angle of each corner in the range of 35 to 80 degrees, the insert will reveal cutting ability equivalent to that of diamond-shaped inserts.

If only one protrusion is formed on each side of the insert, or if a plurality of protrusions on each side of the insert are asymmetrically arranged, the insert cannot be restrained sufficiently stably. Thus, according to the present invention, at least two protrusions are formed on each side of the insert so as to be symmetrical with respect to the center of the side. By providing three or more of such protrusions on each side of the insert, the insert can be restrained especially stably.

Other structural and operational features of the invention and other advantages of the invention are discussed in the description of embodiments.

According to the present invention, the recess and protrusions are formed on each side of the basically equilateral triangular insert. The recess and protrusions on one side of the insert are brought into engagement with the protrusion and recesses formed on the side wall of the holder, and the bottom and the side of the inert are pressed against the bottom seating face and side wall of the seating groove. Thus, when cutting radially outer surfaces and end faces or workpieces and performing contour cutting with the insert according to the present invention, of which the three corners are usable as cutting edges, the insert can be stably restrained while ensuring necessary side cutting edge angle and end cutting edge angle even if the direction of the cutting force changes.

Thus, by using the insert according to the present invention in performing cutting of the kind that has heretofore been performed using diamond-shaped inserts, such cutting can be performed economically while holding the cutting edge with as high positional accuracy as in the case of diamond-shaped inserts.

BEST MODE FOR EMBODYING THE INVENTION

Figure 1:
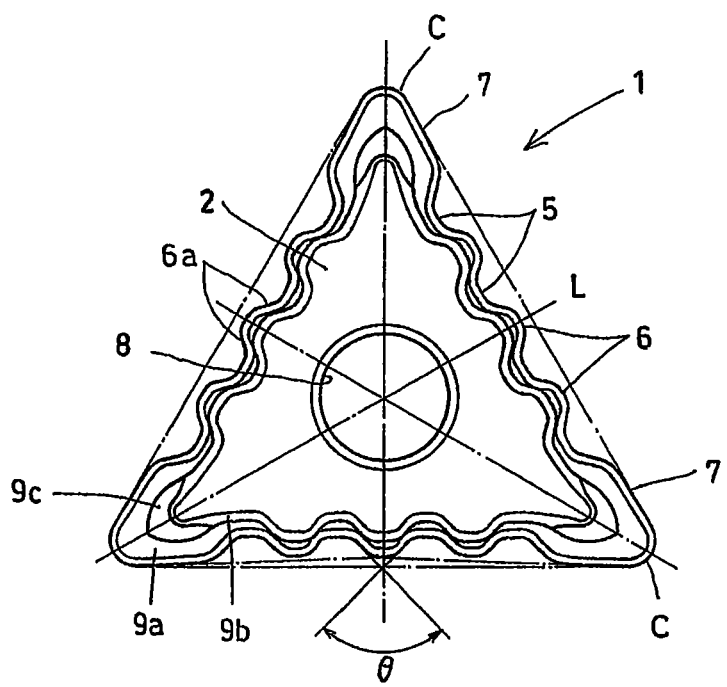
FIG. 1(a) is a plan view of an insert with multiple alternately usable cutting edges embodying the present invention.
FIG. 1(b) is a side view of the same.
Figure 1:
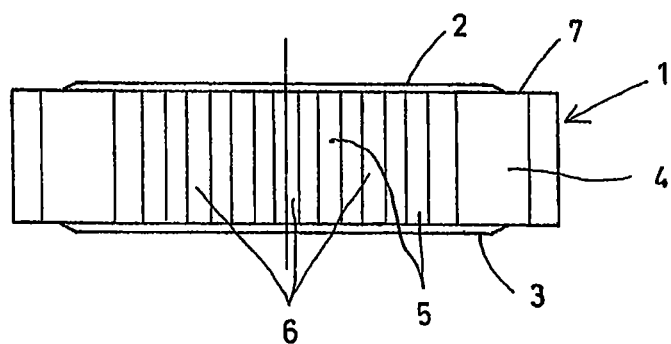

FIGS. 1(a) and 1(b) show an insert with multiple alternately usable cutting edges embodying the invention. This insert, designated by numeral 1, is a substantially equilateral triangular plate member having parallel top and bottom surfaces 2 and 3. Each of its three corners C has an apex angle of 55 degrees. Its three sides 4 intersect with the top and bottom surface at a right angle. As viewed from the top of the insert, each side 4 is formed with four V-shaped recesses 5 alternating with three inverted V-shaped protrusions 6. The apexes of the protrusions 6 are located on or inside of the lines connecting the respective corners C so that the apex angle of each corner C can be adjusted to e.g. 55 degrees, which is equivalent to the angle of the two acute corners of diamond-shaped inserts.

The central one of the three protrusions 6 formed on each side 4 is located on the line L connecting the center of the insert and the center of the corresponding side 4. The three protrusions 6 on each side 4 are arranged with equal pitches.

So are the four recesses 5 on each side 4. Thus, as viewed from top, any two sides 4 are symmetrical with respect to the line L passing the other side 4.

In order to restrain the insert as stably as possible on a holder, each protrusion 6 should have a sufficiently large contact surface area with a V-shaped recess formed in the seating face of the holder. Taking also into consideration the wedging effect when the V-shaped protrusions 6 are engaged in the V-shaped recesses in the seating face of the holder, and the strength of the protrusions 6, each protrusion 6 preferably comprises two flat surfaces 6a forming an angle $\theta$ of 60 to 120 degrees as viewed from the top of the insert. More preferably, the value $\theta$ is about 90 degrees, because such protrusions 6 are substantially identical in shape and size to the protrusions formed on the seating face of the holder.

At least two such protrusions 6 have to be formed on each side 4 so as to be symmetrical with respect to the line L. Preferably, however, a larger number of protrusions 6 are provided to increase the contact surface area with the seating face of the holder, thereby more stably restraining the insert. In this case, the insert cannot uniformly engage the holder unless the protrusions 6 are arranged with uniform pitches. Thus, the protrusions 6 are preferably arranged with uniform pitches.

Preferably, the recesses 5 and the protrusions 6 are formed in a mold, and sintered. After sintering, their sintered surfaces are preferably not ground to improve productivity and reduce the cost.

A chip breaker for breaking chips may be provided on the top and/or bottom surface 2 and 3. The insert 1 shown has a chip breaker on the top surface 2 which comprises a chip breaker groove 9a, chip breaker walls 9b rising from the bottom of the chip breaker groove 9a toward the central land of the insert, and spherical protrusions 9c provided near the respective noses of the insert.

Figure 2:
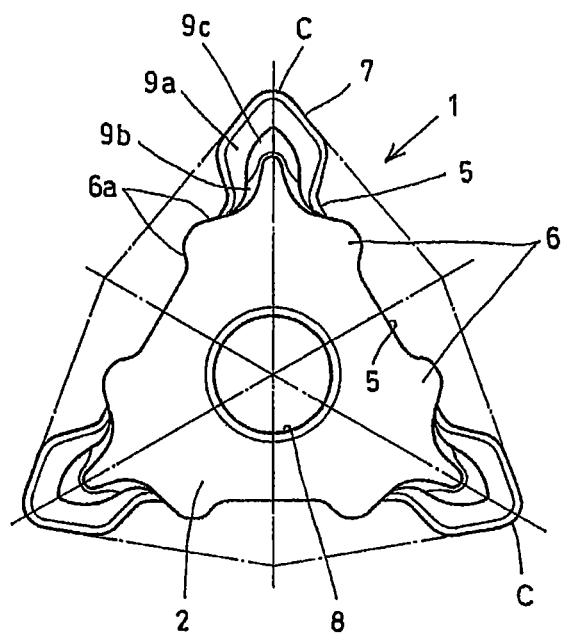
FIG. 2(a) is a plan view of an insert with multiple alternately usable cutting edges according to another embodiment of the present invention.
FIG. 2(b) is a side of the insert of FIG. 2(a)
Figure 2:
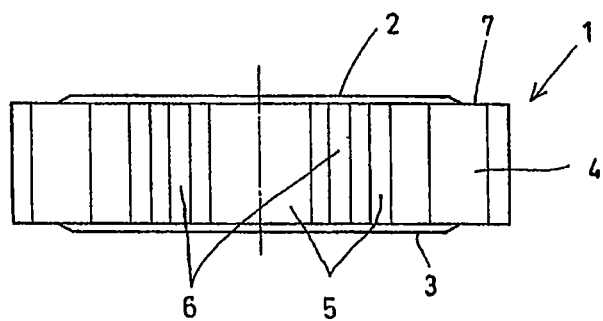

FIGS. 2(a) and 2(b) show the insert 1 according to the second embodiment. Each of the three corners C of the insert 1 of FIGS. 2(a) and 2(b) has an apex angle of 80 degrees. As seen from the top of the insert, each of the three sides 4 is formed with two protrusions 6 and three recesses 5 alternating with the protrusions 6 so as to be symmetrical with respect to the corresponding line L.

At least two such protrusions 6 have to be provided on each side 4. But for the reasons set forth in connection with the first embodiment, three or more such protrusions 6 are preferably provided.

Figure 3:
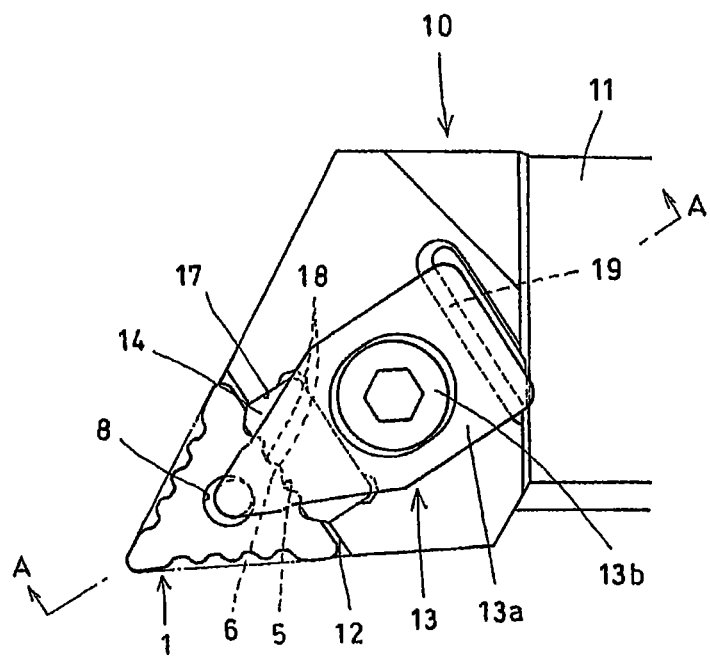
FIG. 3 is a plan view of a cutting tool embodying the present invention.
Figure 4:
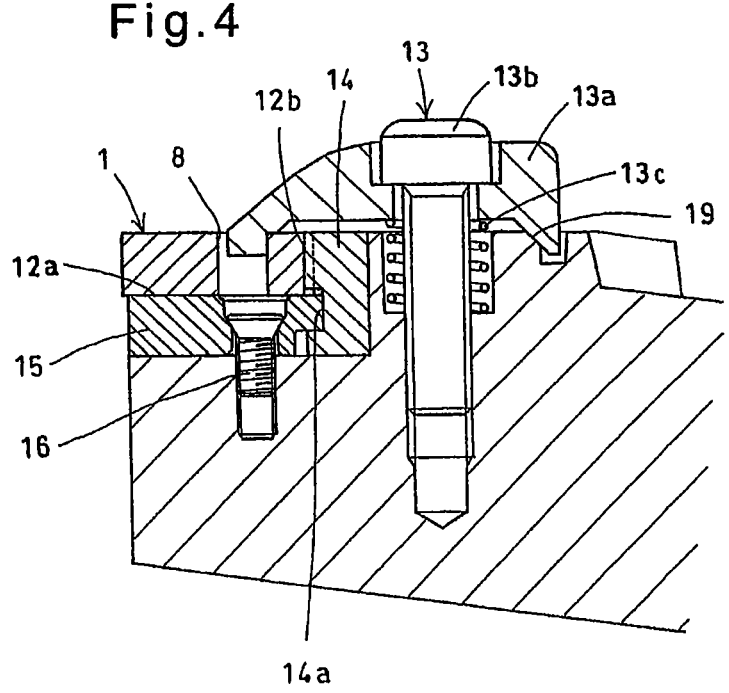
FIG. 4 is a sectional view taken along line A-A of FIG. 3.

FIGS. 3 and 4 show a cutting tool using the insert 1 according to the present invention.

The cutting tool shown, designated by numeral 10, comprises a holder 11 formed with a seating groove 12 at its end, the insert 1, which is seated in the seating groove 12, a clamp means 13 for pressing and fixing the insert 1 seated in the groove 12, a piece 14 detachably mounted to the holder 11, a bottom plate 15 which also serves as a fastener for the piece 14, and a set screw 16 for the bottom plate.

The seating groove 12 includes a bottom seating face 12a on which the insert is seated, and a side wall 12b which restrains one of the three sides of the insert 1. In the embodiment, the top surface of the bottom plate 15 defines the bottom seating face 12a. The side wall 12b of the seating groove is defined by the piece 14. The piece 14 is fixed in position by fitting the piece 14 in a recess 17 formed in the holder 11, engaging the bottom plate 15 in a cutout 14a formed in a lower portion of the front face of the piece 14, and fixing the holder 11 by clamping it with the set screw 16. But a separate fastener or set screw may be used to fix the piece 14 separately from the bottom plate 15. The bottom plate 15 may be omitted.

Recesses and protrusions 18 are formed on the side wall 12b that correspond to the respective protrusions and recesses 6 and 5 formed on each side of the insert 1. The protrusions and recesses 6 and 5 formed on one side of the insert 1 are brought into engagement with the respective recesses and protrusions 18. The recesses and protrusions extend from an upwardly facing top surface to a downwardly facing bottom surface substantially along a thickness direction of the insert.

The clamp means 13 comprises a presser 13a, a clamp bolt 13b for clamping the presser 13a, and a spring 13c biasing the insert 1 upwardly so that the insert 1 can be dismounted easily.

The presser 13a has claws at front and rear ends thereof. With the presser 13a placed on the holder so that its bottom surface near the claw at the front end engages the top surface of the insert, its claw at the front end engages in the mounting hole 8 of the insert, and its claw at the rear end abuts a tapered surface 19 formed on the holder, the presser 13a is clamped by the clamp bolt 13b. The insert 1 is thus pressed against the bottom seating face 12a. Also, a component of the force produced between the presser 13a and the tapered surface 19 moves the presser 13a rearwardly (due to a play between the clamp bolt 13b and the wall of the bolt hole formed in the presser 13a). The insert 1 is thus pressed against the side wall 12b with the recesses 5 and the protrusions 6 on one side of the insert 1 in engagement with the respective protrusions and recesses 18 of the side wall. The insert 1 is thus rigidly restrained by the seating groove 12.

The side wall face 12b, as well as its recesses and protrusions 18 may be formed directly on the holder 11. But more preferably, they are formed on the piece 14 as shown, because the piece 14 is detachable from the holder 11 and thus the side wall 12b can be more easily formed on the piece 14 while the piece 14 is not mounted on the holder 11. Also, if the side wall 12b is damaged, a new side wall 12b can be formed easily on a new piece 14. For higher durability, the piece 14 may be made of steel of which the surface hardness is increased by heat treatment or made of carbide.

Preferably, the side wall 12b is slightly inclined forwardly toward its top edge so that when the insert 1 is pressed against the side wall 12b, a component of the force produced therebetween serves to press the insert 1 downwardly, thereby more stably holding the insert 1. Preferably, the side wall 12b is inclined forwardly by an angle of about 30 minutes to 2 degrees.

Figure 5:
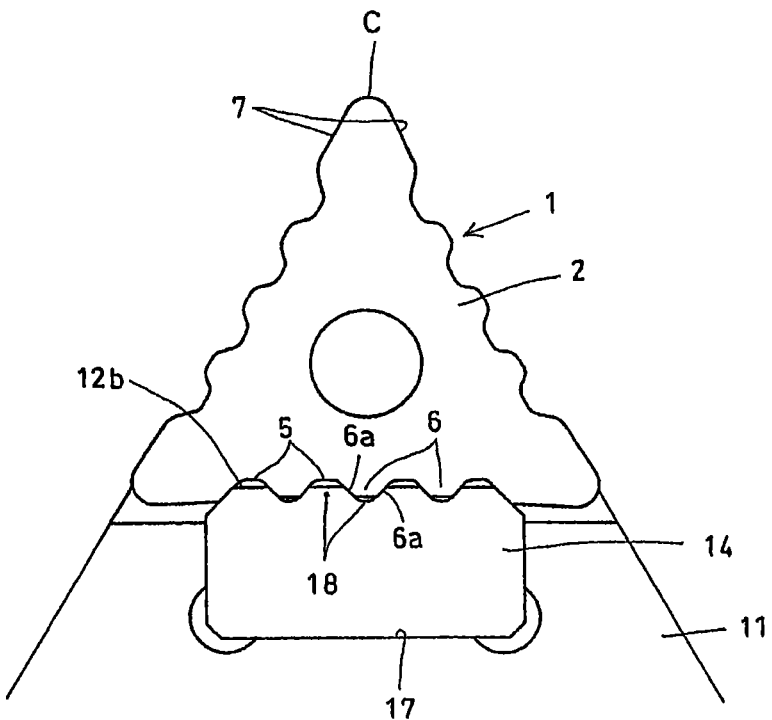
FIG. 5 shows in detail how the insert is in engagement with the seating face along one side thereof.
Figure 6:
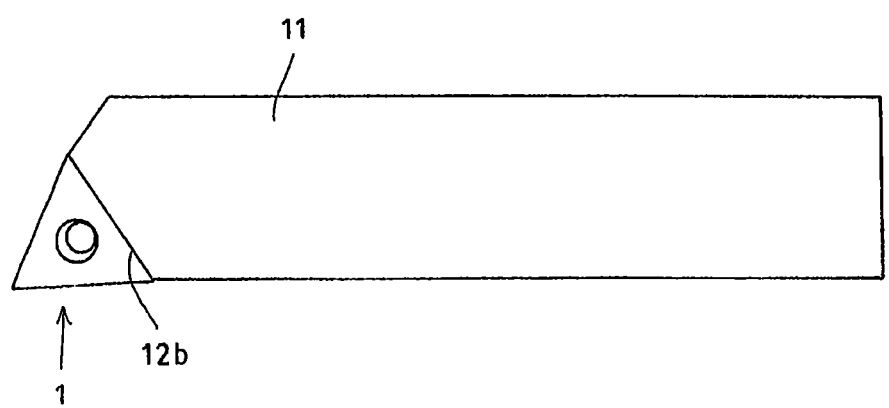
FIG. 6 is a plan view of a conventional tool using a triangular insert.

FIG. 5 shows how one of the sides 4 of the insert is brought into engagement with the side wall 12b of the seating groove 12. As mentioned above, the two flat surfaces of each protrusion 6 preferably form an angle θ (see FIG. 1) of 60 to 120 degrees. In this case, any two adjacent surfaces of the recesses and protrusions 18 that are brought into contact with the corresponding flat surfaces 6a form an angle of 120 to 60 degrees. By setting the angle θ at a more preferable value of 90 degrees, any two adjacent surfaces of the recesses and protrusions 18 will also form an angle of about 90 degrees.

If only one protrusion 6 is formed on each side of the insert, when the one protrusion 6 is fitted in the V-shaped recess formed in the side seating groove, the insert 1 tends to shift and cannot be positioned with high accuracy. Thus, at least two such protrusions 6 have to be formed on each side of the insert, which are engaged in two respective V-shaped grooves formed in the side wall 12b at such points that the insert can be held in position with good balance.

The clamp means for fixing the insert 1 to the holder is not limited to the one shown, provided it can press the insert 1 against the bottom seating face and the side wall.

The mounting hole formed in the insert may be replaced with a recess for engaging the presser of the clamp means.

What is claimed is:

1. A plate-shaped cutting insert with multiple alternately usable cutting edges having basically the shape of an equilateral triangle, the plate-shaped cutting insert comprising:
   an upwardly facing top surface;
   a downwardly facing bottom surface;
   three acute corners with a cutting edge formed at each of the acute corners; and
   three sides, each side defined between the cutting edges formed at two of the three acute corners and extending from said upwardly facing top surface to said downwardly facing bottom surface,
   wherein each of said sides being formed with a recess and at least two protrusions as seen from the top of the insert,
   said recess and said protrusions extending from said upwardly facing top surface to said downwardly facing bottom surface substantially along a thickness direction of the insert and being adapted to be brought into engagement with a protrusion and recesses formed on a side wall of a holder, said protrusions on each side being symmetrical with respect to a line connecting the center of said insert with the center of said each side,
   said multiple alternately usable cutting edges comprising three pairs of straight cutting edges extending from the respective three acute corners,
   each of said protrusions having an apex located inside of extensions of the respective straight cutting edges, and
   there are provided three or more of said protrusions, said three or more protrusions being arranged with equal pitches.

2. A cutting tool comprising:
   a holder having at its front end a seating groove including a side wall and a bottom seating face;
   a plate-shaped cutting insert which is seated in said seating groove, the insert including multiple alternately usable cutting edges having basically the shape of an equilateral triangle, the plate-shaped cutting insert comprising:
   an upwardly facing top surface;
   a downwardly facing bottom surface;
   three acute corners with a cutting edge formed at each of the acute corners; and
   three sides, each side defined between the cutting edges formed at two of the three acute corners and extending from said upwardly facing top surface to said downwardly facing bottom surface,
   wherein each of said sides being formed with a recess and at least two protrusions as seen from the top of the insert,
   said recess and said protrusions extending from said upwardly facing top surface to said downwardly facing bottom surface substantially along a thickness direction of the insert and being adapted to be brought into engagement with a protrusion and recesses formed on a side wall of a holder, said protrusions on each side being symmetrical with respect to a line connecting the center of said insert with the center of said each side,
   said multiple alternately usable cutting edges comprising three pairs of straight cutting edges extending from the respective three acute corners, each of said protrusions having an apex located inside of extensions of the respective straight cutting edges, and wherein said insert being fixed to said holder by bringing said protrusions and recess formed on one of said sides into engagement with respective recesses and protrusion formed on said side wall of said holder and pressing said insert against said bottom seating face and said side wall with a clamp, and the remaining two sides of the insert are not in engagement with said holder.

3. The cutting tool of claim 2 further comprising:

a piece detachably mounted to the side wall of said holder and fixed to said holder by means of a fastener, said piece being formed with said recesses and protrusion adapted to be brought into engagement with said protrusions and recess formed on one of said sides of said insert.

* * * * *